(12) United States Patent
Katou

(10) Patent No.: US 6,822,014 B2
(45) Date of Patent: Nov. 23, 2004

(54) AQUEOUS COATING COMPOSITION AND FLOOR POLISHING COMPOSITION

(75) Inventor: Minoru Katou, Tokyo (JP)

(73) Assignee: JSR Corporation, Tokyo (JP)

( * ) Notice: Subject to any disclaimer, the term of this patent is extended or adjusted under 35 U.S.C. 154(b) by 216 days.

(21) Appl. No.: 10/131,186

(22) Filed: Apr. 25, 2002

(65) Prior Publication Data

US 2003/0065047 A1 Apr. 3, 2003

(30) Foreign Application Priority Data

Apr. 26, 2001 (JP) .......................................... 2001-129204

(51) Int. Cl.$^7$ ........................ C09D 133/02; C08L 35/00
(52) U.S. Cl. ........................................ 522/85; 524/833
(58) Field of Search ...................... 522/84, 85; 524/833

(56) References Cited

U.S. PATENT DOCUMENTS

| | | | | |
|---|---|---|---|---|
| 4,107,013 A | * | 8/1978 | McGinniss et al. | ......... 524/524 |
| 5,045,435 A | | 9/1991 | Adams et al. | |
| 5,676,741 A | * | 10/1997 | Gray et al. | ..................... 106/3 |
| 5,837,745 A | * | 11/1998 | Safta et al. | ..................... 522/8 |
| 5,977,228 A | * | 11/1999 | Mauer | ......................... 524/284 |
| 5,981,147 A | * | 11/1999 | Hallock et al. | ........... 430/281.1 |
| 6,476,108 B1 | | 11/2002 | Mogi et al. | |

FOREIGN PATENT DOCUMENTS

EP      0 367 812 B1     *    3/1995

* cited by examiner

*Primary Examiner*—Susan Berman
(74) *Attorney, Agent, or Firm*—Oblon, Spivak, McClelland, Maier & Neustadt, P.C.

(57) ABSTRACT

An aqueous coating composition useful as a floor polishing agent is disclosed. The composition comprises (A) an aqueous dispersion of a copolymer obtained by the emulsion polymerization of (a) an ethylenically unsaturated carboxylic acid monomer, (b) a (meth)acrylic acid alkyl ester monomer, and (c) other monomers polymerizable with the monomers (a) and (b), (B) an unsaturated monomer curable with energy rays, and (C) a photoinitiator. The floor polishing agent containing the aqueous coating composition exhibits excellent delamination properties and dry buff applicability.

19 Claims, No Drawings

US 6,822,014 B2

AQUEOUS COATING COMPOSITION AND FLOOR POLISHING COMPOSITION

BACKGROUND OF THE INVENTION

1. Field of the Invention

The present invention relates to an aqueous coating composition and a floor polishing composition using the aqueous coating composition.

2. Description of the Background Art

A beautiful outward appearance is required for floor materials in department stores and convenience stores. Because these floor materials are severely contacted by customer's shoes (especially, by women's high-heeled shoes), the coating agent or polishing agent for the floor materials must have high durability.

As a coating agent with excellent durability, Japanese Patent Application Laid-open No. 225670/1988, for example, discloses a UV curable resin composition which comprises a photopolymerizable prepolymer containing a carboxylic acid group and/or a carboxylate group and a photoinitiator.

Because the photopolymerizable prepolymer disclosed in this patent application is polymerizable by itself, the photopolymerizable prepolymer crosslinks by irradiation with UV light and forms a strong film. Therefore, a coating agent containing such a composition has reduced alkali solubility and thermoplasticity.

The reduced alkali solubility and thermoplasticity impair delamination properties of the coatings with alkali and dry buff applicability when the coating agent is used for polishing floors.

An object of the present invention is to provide an aqueous coating composition and a floor polishing composition exhibiting excellent delamination properties and dry buff applicability.

SUMMARY OF THE INVENTION

The aqueous coating composition of the present invention comprises:

(A) 100 parts by weight (on a solid component basis) of an aqueous dispersion of a copolymer obtained by the emulsion polymerization of (a) 5–30 wt % of an ethylenically unsaturated carboxylic acid monomer, (b) 10–80 wt % of a (meth)acrylic acid alkyl ester monomer, and (c) 0–85 wt % of a monomer polymerizable with the monomers (a) and (b), provided that the total of monomers (a), (b), and (c) is 100 wt %, (B) 0.5–200 parts by weight of an unsaturated monomer curable with energy rays, and (C) a photoinitiator in an amount of 0.01–10 parts by weight for 100 parts by weight of the component (B).

The aqueous coating composition of the present invention can produce coatings exhibiting excellent solubility in alkali, thermoplasticity, and durability. The reason is considered to be as follows.

The aqueous coating composition of the present invention contains (A) a copolymer made form ethylenically unsaturated monomers and (B) energy ray curable unsaturated monomer. Therefore, if the aqueous coating composition is irradiated with an energy ray, for example, ultraviolet radiation, the energy ray curable unsaturated monomer polymerizes producing a polymer or copolymer (hereinafter referred to as "(co)polymer"). Specifically, both the copolymer (A) containing ethylenically unsaturated monomers and the copolymer containing the energy ray curable unsaturated monomers (B) are present in the coating agent containing this aqueous coating composition. For this reason, the coating agent containing the aqueous coating composition of the present invention is more soluble in alkali and exhibits better thermoplasticity than the above-described polymers made from photopolymerization property prepolymers. In addition, due to inclusion of the (co)polymer made from energy ray curable unsaturated monomers (B), the aqueous coating composition of the present invention has durability which is more excellent than that of copolymers made only from ethylenically unsaturated monomers.

The copolymer used in the aqueous coating composition of the present invention preferably has a weight average molecular weight of 200,000 or more.

The content of components insoluble in solvents in the copolymer is 20–98 wt %. The solvent here is toluene.

The aqueous coating composition of the present invention can be used as a floor polishing composition.

Other objects, features and advantages of the invention will hereinafter become more readily apparent from the following description.

DETAILED DESCRIPTION OF THE INVENTION AND PREFERRED EMBODIMENTS

The aqueous coating composition of the present invention will be described in detail. In the following description, the copolymer (A) made from ethylenically unsaturated monomers and the energy ray curable unsaturated monomers (B) used in the aqueous coating composition are referred to from time to time respectively as "component (A)" and "component (B)".

Aqueous Coating Composition (Monomer Composition)

In the preparation of the aqueous coating composition of the present invention, the following compounds can be given as examples of ethylenically unsaturated carboxylic acid monomers (a) for the component (A) or monomers converted into carboxyl group-containing ethylenically unsaturated monomers when polymerized by emulsion polymerization using an aqueous medium:

(i) mono-carboxylic acids such as an acrylic acid, methacrylic acid, and crotonic acid;

(ii) di-carboxylic acids such as maleic acid, fumaric acid, and itaconic acid;

(iii) half esters such as methyl maleate, methyl itaconate, and β-methacrylic oxyethyl acid hexahydrophthalate; and (iv) anhydrides of unsaturated carboxylic acids given in (i) and (ii), such as acrylic acid anhydride and maleic acid anhydride, which can be used as monomers for emulsion polymerization because these are converted into carboxylic acids when polymerized by emulsion polymerization using an aqueous medium; and (v) potassium salt, sodium salt, ammonium salt, magnesium salt, and calcium salt of the compounds (i) to (iv).

These compounds may be used either individually or in combination of two or more.

Of the above compounds, ethylenically unsaturated carboxylic acid monomer (a) is preferably at least one monomer selected from the group consisting of the above-described (i) mono-carboxylic acids, (ii) dicarboxylic acids, (iii) half esters, and (iv) dicarboxylic acid anhydrides.

The amount of the ethylenically unsaturated carboxylic acid monomer (a) used in the component (A) is 5–30 wt %, preferably 6–25 wt %, and more preferably 7–20 wt %. If the amount of the monomer (a) is less than 5 wt %, the product exhibits only poor delamination properties and durability; if more than 30 wt %, leveling characteristics of the product are impaired.

When the aqueous coating composition of the present invention is used as a floor polishing composition, the floor polishing composition exhibits excellent properties to be delaminated with alkali, i.e. the properties of being delaminated by neutralizing with an alkaline delaminating solution, due to copolymers having carboxyl groups.

The (meth)acrylic acid alkyl ester monomers (b) for the component (A) are (meth)acrylic acid esters such as methyl (meth)acrylate, ethyl (meth)acrylate, propyl (meth)acrylate, n-butyl (meth)acrylate, i-butyl (meth)acrylate, t-butyl (meth)acrylate, amyl (meth)acrylate, i-amyl (meth)acrylate, hexyl (meth)acrylate, 2-ethylhexyl (meth)acrylate, n-octyl (meth)acrylate, i-octyl (meth)acrylate, cyclohexyl (meth)acrylate, nonyl (meth)acrylate, lauryl (meth)acrylate, and stearyl (meth)acrylate.

Preferable (meth)acrylic acid esters are those having an alkyl group with 1–8 carbon atoms, with methyl methacrylate, ethyl (meth)acrylate, n-butyl (meth)acrylate, and i-butyl (meth)acrylate being more preferable.

The amount of the (meth)acrylic acid alkyl ester monomer (b) used in the component (A) is 10–80 wt %, preferably 20–70 wt %, and more preferably 25–65 wt %. If the amount of the monomer (b) is less than 10 wt %, the product exhibits only poor durability; if more than 80 wt %, the product may have only poor gloss.

The following compounds can be given as examples of the monomer (c) used for the component (A): benzyl (meth)acrylate, phenoxyethyl (meth)acrylate, alkylphenoxyethyl (meth)acrylate, phenoxydiethylene glycol (meth)acrylate, phenoxypolyethylene glycol (meth)acrylate, alkylphenol ethylene oxide (meth)acrylate, alkylphenol propylene oxide (meth)acrylate, 2-hydroxy-3-phenoxypropyl (meth)acrylate, ethylene glycol (meth)acrylate mono-phthalate, and ethylene glycol (meth)acrylate hydroxyethyl phthalate; hydroxyalkyl (meth)acrylates such as hydroxyethyl (meth)acrylate and hydroxybutyl (meth)acrylate; polyethylene glycol (meth)acrylate and/or polypropylene glycol (meth)acrylate; vinyl compounds such as vinyl chloride, vinylidene chloride, vinyl acetate, and fatty acid vinyl esters; fluorine-containing monomers such as trifluoroethyl (meth)acrylate and pentadecafluorooctyl (meth)acrylate; aromatic vinyl monomers such as styrene, α-methylstyrene, 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, and 1-vinylnaphthalene; aminoalkyl esters of ethylene-based unsaturated carboxylic acid such as monoamines, aminoethyl acrylate, dimethylaminoethyl acrylate, and butylaminoethyl acrylate; aminoalkyl amides of ethylene-based unsaturated carboxylic acid such as aminoethyl acrylamide, dimethylaminomethyl methacrylamide, and methylaminopropyl methacrylamide; cyanated vinyl monomers such as (meth)acrylonitrile and α-chloroacrylonitrile; alkoxide compounds such as tetramethoxysilane, tetraethoxysilane, tetra-n-propoxysilane, tetra-i-propoxysilane, tetra-n-butoxysilane, tetra-i-butoxysilane, methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, i-butyltrimethoxysilane, γ-chloropropyltrimethoxysilane, γ-chloropropyltriethoxysilane, 3,3,3-trifluoropropyltrimethoxysilane, 3,3,3-trifluoropropyltriethoxysilane, γ-glycidoxypropyltrimethoxysilane, γ-glycidoxypropyldimethoxyalkylsilane, γ-glycidoxypropyltriethoxysilane, γ-glycidoxypropyldiethoxyalkylsilane, γ-methacryloxypropyltrimethoxysilane, γ-methacryloxypropyltriethoxysilane, γ-mercaptopropyltrimethoxysilane, γ-mercaptopropyltriethoxysilane, γ-aminopropyltrimethoxysilane, γ-aminopropyltriethoxysilane, vinyltrimethoxysilane, vinyltriethoxysilane, phenyltrimethoxysilane, phenyltriethoxysilane, 3,4-epoxycyclohexylethyltrimethoxysilane, 3,4-epoxycyclohexylethyltriethoxysilane, dimethyldimethoxysilane, dimethyldiethoxysilane, diethyldimethoxysilane; and poly-functional monomers such as divinylbenzene, ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, tetrapropylene glycol di(meth)acrylate, butanediol di(meth)acrylate, hexanediol di(meth)acrylate, trimethylolpropane tri(meth)acrylate, pentaerythritol tetra(meth)acrylate, and allyl (meth)acrylate.

In addition to the above monomers, carbonyl group-containing monomers having at least one aldo group or keto group and one polymerizable double bond in the molecule may be used. Specifically, the carbonyl group-containing monomers should be a polymerizable mono-olefinic unsaturated aldo compound or keto compound, and compounds having only an ester group (—COC—) or a carboxyl group (—COOH) are excluded.

These carbonyl group-containing monomers include acrolein, diacetone acrylamide, formyl styrol, vinyl methyl ketone, vinyl ethyl ketone, and vinyl isobutyl ketone, and are preferably vinyl alkyl ketones having 4–7 carbon atoms represented by the following formula,

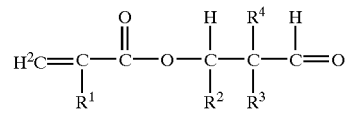

wherein $R^1$ represents a hydrogen atom or methyl group, $R^2$ represents a hydrogen atom or an alkyl group having 1–3 carbon atoms, $R^3$ represents an alkyl group having 1–3 carbon atoms, and $R^4$ represents an alkyl group having 1–4 carbon atoms. Specific examples include the following compounds: (meth)acryloxyalkyl propanal, acetonitrile acrylate, diacetone acrylate, diacetone methacrylate, 2-hydroxypropyl acrylate-acetyl acetate, and butanediol-1, 4-acrylate-acetyl acetate. Among these compounds, diacetoneacrylamide, acrolein, and vinyl methyl ketone are preferable.

These other monomers (c) can be used either individually or in combination of two or more.

The amount of the other monomers (c) used in the component (A) is 0–85 wt %, preferably 5–80 wt %, and particularly preferably 10–70 wt %. If more than 85 wt %, the resulting products exhibit poor durability.

The energy ray curable unsaturated monomers (B) in the present invention are monomers polymerizable by irradiation with an energy ray such as ultraviolet radiation and electron beams. These monomers contain one and more (meth)acryloyl groups in the molecule. Specific examples include the following compounds.

(i) Polyol Polyacrylates

The polyol polyacrylate can be obtained as a polyacrylate of a divalent or higher valent polyhydric alcohol, or of an alkylene oxide addition polyhydric alcohol to the divalent or higher valent polyhydric alcohol. Specific examples include polyacrylate such as neopentyl glycol diacrylate, 1,6-hexanediol diacrylate, trimethylolpropane triacrylate, ditrimethylolpropane tetraacrylate, pentaerythritol tetraacrylate, and dipentaerythritol hexaacrylate.

Among these, preferable polyol polyacrylates are a polypropylene glycol diacrylate such as dipropylene glycol diacrylate and tripropylene glycol diacrylate, a triacylate of propylene oxide addition compound to trimethylolpropane, a polyacrylate of a polyhydric alcohol made by addition of propylene oxide to a divalent or higher valent polyhydric alcohol such as a triacylate of propylene oxide addition compound to glycerol, a tetraacylate of propylene oxide addition compound to pentaerythritol, and a diacylate of propylene oxide addition compound to bisphenol A.

(ii) Polyester Acrylates

A polyester acrylate can typically be obtained by esterification of a polyhydric alcohol and a polyvalent carboxylic acid and/or its anhydride and acrylic acid. Examples are a polyester diol diacrylate of maleic acid (anhydride) and ethylene glycol, a polyester diol diacrylate of phthalic acid (anhydride) and diethylene glycol, a polyester diol diacrylate of adipid acid and triethylene glycol, a polyester polyol polyacrylate of tetrahydrophthalic acid (anhydride) and trimethylolpropane, and the like.

(iii) Epoxy Acrylates

An epoxy acrylate can typically be obtained by reacting an epoxy resin with a mixture of an acrylic acid or carboxyl group-containing acrylate and a polybasic acid. Examples are epoxy acrylates such as diacylate of bisphenol A diglycidyl ether, diacrylate of neopentyl glycol diglycidyl ether, and diacrylate of 1,6-hexanediol diglycidyl ether.

(iv) Urethane Acrylates

A urethane acrylate can typically be obtained by reacting a polyhydric alcohol, polyvalent isocyanate, and hydroxyl group-containing acrylate. Examples are polyester diols of an organic polybasic acid such as an adipic acid, sebacic acid, maleic acid, or terephthalic acid and a polyhydric alcohol such as an ethylene glycol, propylene glycol, 1,4-butylene glycol, or 1,6-hexanediol; addition compounds of a diisocyanate such as a tolylene diisocyanate, isophorone diisocyanate, 4,4'-diphenylmethane isocyanate, hydrogenated tolylene diisocyanate, or 1,6-hexamethylene diisocyanate and a 2-hydroxyethyl acrylate; and addition compounds of a polyether diol such as a polypropylene glycol or polytetramethylene glycol, a diisocyanate such as a tolylene diisocyanate, isophorone diisocyanate, 4,4'-diphenylmethane isocyanate, hydrogenated tolylene diisocyanate, or 1,6-hexamethylene diisocyanate, and a 2-hydroxyethyl acrylate.

(v) Other Polymerizable Acrylates

A polyacryloyloxy phosphate, polysiloxane acrylic resin, and the like.

The above energy ray curable unsaturated monomers (B) can be used either individually or in combination of two or more. A polymerizable acrylate with a high viscosity which can be handled only with difficulty can be used in combination with a polymerizable acrylate with a low viscosity appropriately selected from the above-mentioned polymerizable acrylates. If necessary, other acrylic monomers may also be added.

When a highly hydrophilic polymerizable acrylate such as polyethylene glycol is used, a lipophilic polymerizable acrylate such as polypropylene glycol or other monomers may be mixed.

The amount of the energy ray curable unsaturated monomer (B) used for 100 parts by weight of the component (A) is 0.5–200 parts by weight, preferably 10–150 parts by weight, and more preferably 20–100 parts by weight. If the amount of the component (B) is less than 0.5 part by weight, the product exhibits only poor durability.

As examples of the photoinitiator (C), water soluble or hydrophilic photoinitiators such as Irgacure2959, Darocur1173, Darocur 1116, Irgacure 184 (manufactured by Ciba Geigy), Quantacure ABQ, Quantacure BT, Quantacure QTX (manufactured by Shell Chemical Company), and benzoin, benzoin methyl ether, benzophenone, benzyl dimethyl ketal, 2,4-dimethyl thioxanethone, and the like can be given.

The photoinitiators (C) can be used either individually or in combination of two or more. In addition, these photoinitiators may be used in combination with a photosensitizer such as an amine compound, urea compound, sulfur compound, nitril compound, phosphorus compound, nitrogen compound, and chlorine compound.

When a photoinitiator with low solubility in water is used, such a photoinitiator may be dissolved in the component (B) and/or a solvent before adding to the composition.

When a water soluble or hydrophilic photoinitiator is used, such a photoinitiator may be added while stirring and heating the composition or may be added as is and mixed.

The amount of the photoinitiator (C) used for 100 parts by weight of the component (B) is 0.01–10 parts by weight, preferably 0.5–9 parts by weight, and more preferably 1–8 parts by weight. If the amount of the photoinitiator (C) is less than 0.01 part by weight, curing of the composition may be insufficient, resulting in products with poor durability; if more than 10 parts by weight, the composition may have an impaired pot life and the product may become discolored.

The weight average molecular weight of the copolymer of the component (A) of the present invention is preferably 200,000 or more, and still more preferably 250,000or more. If the weight average molecular weight less than 200,000, durability may be inferior.

The amount of the component insoluble in solvents in the copolymer of the component (A) of the present invention is preferably 20–98 wt %, more preferably 30–95 wt %, and still more preferably 40–90 wt %.

The solvent insoluble component is determined by the following method.

After adjusting the pH of the copolymer to 7, a film is prepared using a hot air drier at 100° C. A prescribed amount (0.5 g) of the film is dipped in a prescribed amount (200 ml) of toluene. The sample-solvent mixture is filtered through a 500 mesh wire gauze to determine the amount (wt %) of the residual solid components in the total solid components.

If the amount of the solvent insoluble components in the copolymer is less than 20 wt %, the product exhibits only poor durability; if more than 98 wt %, the film-forming properties may be impaired.

Average Particle Diameter

The average particle diameter of the copolymer used in the present invention is preferably 0.02–0.5 $\mu$m, more preferably 0.05–0.2 $\mu$m, and particularly preferably 0.06–0.1 $\mu$m. If less than 0.02 $\mu$m, leveling characteristics maybe poor, if more than 0.5 $\mu$m, glossiness of the product may be inferior.

Method of Preparing the Aqueous Coating Composition

There is no specific restriction to the method for preparing the aqueous dispersing material of the present invention. For example, the aqueous dispersing material can be obtained as a copolymer emulsion by a conventional emulsion polymerization method. More specifically, a mixture prepared by adding the above monomers, an emulsifier, initiator, reducing agent, chain transfer agent, chelating agent, pH modifier, and the like to an aqueous medium is subjected to a polymerization reaction at 30–100° C. for 1–30 hours to obtain an aqueous dispersing material.

The polymerization of the above monomers can be carried out by, for example, polymerizing all the monomers in one reaction, polymerizing part of the monomers first and then continuously or intermittently adding the remaining part of the monomers, or polymerizing the monomers while continuously adding monomers during polymerization.

The final polymerization conversion rate of the copolymer of the component (A) used in the present invention is preferably 90–100 wt %, and more preferably 95–100 wt %.

Polymerization initiators, chain transfer agents, emulsifiers, and polymerization modifiers will now be discussed.

<Polymerization Initiator>

In emulsion polymerization, the polymerization initiator is radically decomposed with heating or in the presence of a reducing agent to initiate the polymerization reaction, whereby monomers are polymerized by the addition polymerization. As polymerization initiators, water soluble initiators, oil soluble initiators, and the like can be given.

Persulfates, hydrogen peroxides, t-butylhydroperoxide, and the like can be given as water soluble polymerization initiators. As required, these initiators can be used in combination with a reducing agent.

As examples of reducing agents, sodium pyro-bisulfite, sodium sulfite, sodium thiosulfate, L-ascorbic acid and a salt thereof, sodium formaldehyde sulfoxylate, ferrous sulfate, and the like can be given.

As examples of oil soluble polymerization initiators, 2,2'-azobisisobutyronitrile, 2,2'-azobis(4-methoxy-2,4-dimethylvaleronitrile), 2,2'-azobis-2,4-dimethylvaleronitrile, 1,1'-azobis-cyclohexane-1-carbonitrile, benzoyl peroxide, dibutyl peroxide, cumenehydroperoxide, and the like can be given. Of these, cumenehydroperoxide, isopropylbenzene hydroperoxide, p-methane hydroperoxide, azobisisobutyronitrile, benzoyl peroxide, t-butylhydroperoxide, 3,5,5-trimethylhexanol peroxide, t-butylperoxy(2-ethylhexanoate), and the like are preferred.

These polymerization initiators can be used dissolved either in monomers or a solvent.

The amount of polymerization initiator used is preferably from 0.03–3 parts by weight, more preferably 0.1–0.4 part by weight, for 100 parts by weight of the total amount of monomers. In the emulsion polymerization using these polymerization initiators, the polymerization initiators are added to the polymerization system all at one time, batchwise in portions, or continuously, or these methods of addition may be employed in combination.

<Chain Transfer Agent>

A chain transfer agent may be added to adjust the molecular weight. Given as examples of chain transfer agents are halogenated hydrocarbons (for example, carbon tetrachloride, chloroform, bromoform), mercaptans (for example, n-dodecylmercaptan, t-dodecylmercaptan, n-octylmercaptan, alkyl thioglycolate), xanthogens (for example, dimethylxanthogendisulfide, diisopropylxanthogen disulfide), terpenes (for example, dipentene, terpinolene), 1,1-diphenylethylene, α-methylstyrene dimers (at least one of 2,4-diphenyl-4-methyl-1-pentene (I), 2,4-diphenyl-4-methyl-pentene (II), and 1,1,3-trimethyl-3-phenylindan (III), and preferably a mixture of (I), (II), and (III) at a weight ratio (I)/((II)+(III))=(40–100)/(0–60)), unsaturated cyclic hydrocarbon compounds (for example, 9,10-dihydroanthracene, 1,4-dihydronaphthalene, indene, 1,4-cyclohexadiene), unsaturated heterocyclic compounds (for example, xanthene, 2,5-dihydrofuran), and the like.

The amount of chain transfer agent used is preferably from 0–5 parts by weight for 100 parts by weight of the total amount of monomers. The chain transfer agents are added to the polymerization system all at one time, batchwise in portions, or continuously, or these methods of addition may be employed in combination.

<Emulsifier>

As emulsifiers, anionic surfactants, nonionic surfactants, cationic surfactants, amphoteric surfactants, reactive emulsifiers copolymerizable with the above-mentioned monomers, water-soluble polymers, and the like can be used either individually or in combinations of two or more.

As anionic surfactants, sulfate of higher alcohol, alkylbenzene sulfonate, aliphatic sulfonate, sulfate of polyethylene glycol alkyl ether, and sulfate of polyethylene glycol polypropylene glycol alkyl ether, and the like can be given. Other examples of anionic surfactants include higher alcohol sodium sulfate, alkylbenzene sodium sulfonate, succinic acid dialkyl ester sodium sulfonate, and alkyl diphenyl ether sodium disulfonate. Of these, sodium lauryl sulfate, polyoxyethylene polyoxypropylene alkyl ether sulfate, polyoxyethylene alkyl ether sulfate, and the like are preferably used.

As examples of nonionic surfactants, polyoxyethylene polyoxypropylene alkyl ether, polyoxyethylene alkylether, polyoxyethylene alkylallyl ether, polyoxyethylene nonylphenyl ether, and polyoxyethylene octylphenyl ether can be given. Of these, polyoxyethylene alkyl ether and polyoxyethylene polyoxypropylene alkyl ether are preferable.

Lauryl betaine is preferably used as an ampholytic surfactant.

As cationic surfactants, alkyl pyridinyl chloride, alkylammonium chloride, and the like can be given.

As examples of reactive emulsifiers copolymerizable with the above monomers, sodium styrene sulfonate, sodium allylalkyl sulfonate, sulfate of polyoxyethylene alkylallyl ether, and sulfate of polyoxyethylene polyoxypropylene alkylallyl ether can be given.

As preferable water soluble polymers used as an emulsifier, polyvinyl alcohol, polyacrylate, water soluble (meth)acrylate copolymer, salt of styrene-maleic acid copolymer, salt of styrene-(meth)acrylic acid copolymer, poly(meth)acrylamide, and copolymer of poly(meth)acrylamide can be given. Of these, a partially saponified polyvinyl alcohol, water soluble (meth)acrylate copolymer, salt of carboxylated aromatic vinyl copolymer such as a salt of styrene-maleic acid copolymer, styrene-(meth)acrylic acid copolymer, and the like are preferred.

The amount of emulsifier used is preferably from 0.05–5 parts by weight for 100 parts by weight of the total amount of monomers.

The emulsifiers are added to the polymerization system all at one time, batchwise in portions, or continuously, or these methods of addition may be employed in combination.

<Polymerization Adjusting Agent>

In the present invention, various polymerization adjusting agents may be added as required. For example, a pH adjusting agent, various chelating agents, and the like may be used.

As examples of pH adjusting agents, aqueous ammonia, sodium hydroxide, potassium hydroxide, ammonium hydroxide, sodium hydrogencarbonate, sodium carbonate, potassium carbonate, and disodium hydrogenphosphate can be given. As various chelating agents, glycine, alanine, sodium ethylenediamine tetraacetate, and the like can be given. It is desirable that the chelating agents and pH adjusting agents be used respectively in the amount of about 0–1 part by weight for 100 parts by weight of the total amount of monomers.

As solvents optionally used in the emulsion polymerization, a small amount of methyl ethyl ketone, acetone, trichlorotrifluoroethane, methyl isobutyl ketone, dimethylsulfoxide, toluene, dibutylphthalate, methylpyrrolidone, ethyl acetate, alcohols, cellosolves, carbitols, and the like are used to the extent not impairing processability, emergency safety, environmental safety, and production safety. The amount of the solvent used is preferably about 0–5 parts by weight for 100 parts by weight of the total amount of monomers.

<Other Additives>

The aqueous coating composition may comprises one or more components selected from (1) a wax emulsion, (2) an alkali-soluble resin, (3) a film-forming adjuvant, (4) various other additives such as a wetting agent, dispersant, leveling agent, colloidal silica, urethane emulsion, antiseptic agent, anti-foaming agent, and the like according to the application.

As the wax emulsion (1), a polyethylene-based emulsion and the like can be given. The amount of the wax emulsion (1) on a solids basis is in the range of 0–40 parts by weight, preferably 5–30 parts by weight, and more preferably 10–30 parts by weight, for 100 parts by weight of the copolymer. If the amount of wax emulsion is more than 40 parts by weight, the product has poor glossiness and inferior appearance.

As examples of an alkali-soluble resin (2), styrene-maleic acid copolymer resin, shellac, rosin-modified maleic resin, and the like can be given. These resins can improve the leveling characteristics and delamination characteristics of the aqueous coating composition. The amount of these resins on a solids basis is in the range of 0–50 parts by weight, preferably 5–40 parts by weight, and more preferably 10–30 parts by weight, for 100 parts by weight of the copolymer. If the amount of alkali-soluble resin is more than 50 parts by weight, the resulting product may have inferior durability.

As a film-forming adjuvant (3), film-forming adjuvants such as tributoxy phosphate, tributoxyethyl phosphate, polyhydric alcohols, alkylene glycols such as a diethylene glycol mono-alkyl ether, esters of alkylene glycols, isophorone, benzyl alcohol, monoethyl monomethyl ethers such as 3-methoxy butanol-1, benzylbutyl phthalate, dibutyl phthalate, dimethyl phthalate, triphenyl phosphate, and carbitol; or additives commonly used for coatings such as a pigment may be added. The amount of these film-forming adjuvants on a solids basis is in the range of 0–50 parts by weight, preferably 5–40 parts by weight, and more preferably 10–30 parts by weight, for 100 parts by weight of the copolymer. If more than 50 parts by weight, the resulting product may have inferior durability.

Other additives (4) includes a wetting agent, dispersant, leveling agent, colloidal silica, urethane emulsion, antiseptic agent, anti-foaming agent, and the like.

As examples of a wetting agent, a potassium salt of perfluoroalkyl carboxylic acid, silicon-based wetting agent, acetylene-based wetting agent, and the like can be given.

As examples of a dispersant, anionic surfactants, nonionic surfactants, and the like can be given.

As examples of a leveling agent, a rosin acid ester, polystyrene maleate, polycarboxy-modified acrylic styrene polymer, and the like can be given.

As examples of an antiseptic agent, a mixture of 2-methyl-4-iso-azophosphorus-3-one, 5-chloro-2-methyl-4-iso-azophosphorus-3-one, and the like can be given.

In addition, a hydrazide compound such as an adipic acid dihydrazide and the like may be added to a copolymer of a carbonyl group-containing monomer such as acrolein, diacetone acrylamide, and the like.

The aqueous coating composition of the present invention can be used as a polishing agent for floors, furniture, and vehicles, particularly as a floor polishing agent. When used as a floor polishing agent, the aqueous coating composition of the present invention is applied to a substrate by fabric coating, brushing, brush spraying immediately followed by drying in air or by heating, thereby producing a strong coating film.

When floors become considerably dirty and damaged, this type of floor polishing agent may be delaminated using an alkaline delaminating agent and a coating can be applied again.

When the degree of dirt and damages is not so significant as require delaminating or re-coating, the coating surface may be melted and flattened by grinding. This treatment is called a buffing treatment. In the buffing treatment, coatings are ground by rotating pad to melt the coating surface by frictional heat caused by rotation, whereby the surface is again flattened.

EXAMPLES

The present invention will be described in more detail by examples, wherein floor polishing compositions used for polishing floors were prepared to evaluated the characteristics.

Example 1

(Method of Preparing Floor Polishing Compositions)
(1) Preparation of Aqueous Copolymer Dispersion A glass reaction vessel (0.5 l) equipped with a stirrer, a condenser, a thermometer, and a dripping funnel was charged with 100 parts by weight of ion-exchanged water, 0.5 part by weight of sodium lauryl sulfate, and 0.1 part by weight of ammonium persulfate. After replacing internal air with nitrogen gas, the mixture was gradually heated to an internal temperature of 65° C. while stirring. An emulsion previously prepared from 50 parts by weight of ion-exchanged water, 1 part by weight of sodium lauryl sulfate, 0.1 part by weight of ammonium persulfate, and monomers shown in Table 1 in a separate container was added dropwise to the mixture over three hours. During dropwise addition of the emulsion, the reaction was carried out at 80° C. while introducing nitrogen gas. After the addition, the mixture was stirred for two hours at 85° C., and cooled to 25° C. to terminate the reaction.

The polymerization conversion rate of the resulting copolymers was 98 wt % or more. Almost no coagulates were produced.
(2) Adjustment of Copolymers The copolymer dispersion prepared above was adjusted to pH 7 with potassium carbonate while stirring at 25° C.

Example 2

The same reaction vessel as used in Example 1 was equipped with the same instruments as in Example 1, and charged with 100 parts by weight of ion-exchanged water, 0.5 part by weight of sodium lauryl sulfate, and 0.1 part by weight of ammonium persulfate. After replacing the internal air with nitrogen, the temperature was adjusted to 80° C. while stirring. An emulsion previously prepared by mixing 10 parts by weight of ion-exchanged water, 0.2part by weight of sodium lauryl sulfate, 0.02 part by weight of ammonium persulfate, and a first lot of monomers shown in Table 1 in a separate container was added dropwise to the mixture over 36 minutes at 80° C. The resulting mixture was reacted for a further 10 minutes. Then, an emulsion previously prepared by mixing 40 parts by weight of ion-exchanged water, 0.8 part by weight of sodium lauryl sulfate, 0.08 part by weight of ammonium persulfate, and a second lot of monomers shown in Table 1 in a separate container was added dropwise to the mixture over 144 minutes at the same temperature. The reaction product was processed in the same manner as in Example 1 to obtain a copolymer at a polymerization conversion rate of 98 wt % or more.

Example 3

At the time when 40 wt % of the emulsion containing the first lot of monomers shown in Table 1 has been added dropwise to the reaction vessel of Example 2, another emulsion made from 40 parts by weight of ion-exchanged water, 0.8 part by weight of sodium lauryl sulfate, 0.08 part by weight of ammonium persulfate, and the second lot of monomers shown in Table 1 was added dropwise to the container containing the emulsion of the first lot of emulsion over 90 minutes. Then, the resulting mixture was added to the reaction vessel dropwise and thereafter processed in the same manner as in Example 1 to obtain a copolymer at a polymerization conversion rate of 98 wt % or more.

Comparative Examples 1–8

In Comparative Examples 1–8, copolymers were prepared in the same manner as in Example 1 except for changing the composition and amount of monomers, as shown in Table 1.

Comparative Examples 9–10

In Comparative Examples 9–10, a urethane-based polymer prepared by the following method was used as a copolymer dispersion.

A reaction vessel equipped with a reflux condenser, thermometer, and stirrer was charged with 53 parts by weight polytetramethylene glycol, 19 parts by weight of tolylene diisocyanate, 5 parts by weight of dimethylol propionic acid, and 20 parts by weight of toluene. The urethanization reaction was carried out while controlling the temperature of the reaction vessel at 100° C. Then, a total of 23 parts by weight of 2-hydroxyethyl acrylate was added dropwise while maintaining the reaction vessel at 80° C. After the reaction, the reaction mixture was neutralized with triethylamine, followed by the addition of distilled water to obtain a urethane-based aqueous polymer.

(3) Preparation of Floor Polishing Compositions

Floor polishing compositions were prepared from the following components.

(Formulation of Floor Polishing Compositions)

| | |
|---|---|
| Aqueous copolymer dispersion *1 | 80 parts by weight |
| Wax emulsion *2 | 15 parts by weight |
| Alkali-soluble resin *3 | 5 parts by weight |
| Fluorine-based surfactant *4 | 0.5 part by weight |

*1 A film-forming adjuvant prepared by mixing tributoxyethylphosphate and diethylene glycol mono-ethyl ether at a weight ratio of 1:4 was added to copolymer dispersions obtained in Examples 1–3 and Comparative Examples 1–10, the minimum film-forming temperature was adjusted to 5° C., and the solid component percentage was adjusted to 20 wt % by the addition of ion-exchanged water.
*2 Wax emulsion: "HYTEC E-4B" manufactured by Toho Chemical Co., Ltd. The solid component percentage was adjusted to 20 wt %.
*3 Alkali-soluble resin: "SMB6 25A" (styrene-maleic acid resin with an acid number of 220 and molecular weight of 1,900) manufactured by ARCO Chemical Company. The solid component percentage was adjusted to 15 wt %.
*4 Fluorine-based surfactant: $C_6F_{17}SO_2N(C_2H_5)CH_2COOK$, the solid component percentage was adjusted to 1 wt %.

(4) Evaluation of Floor Polishing Compositions

The floor polishing compositions were evaluated according to the following methods.

(a) Black Heel Mark Resistance

Black heel mark resistance and anti-scuff properties (hereinafter described) are standards for evaluating durability.

The floor polishing compositions were applied to homogeneous tiles in an amount of 10 g per one square meter, and dried. The coating was exposed to light from a UV lamp at a dose of 1,000 mJ/cm².

Application was repeated three times to obtain samples. The samples were placed on a busy street where people were passing 50–100 times, back and forth per day to observe the degree of black heel mark (BHM) attachment. The results of evaluation were classified as follows.

◯: There are only a small number of black heel marks.

Δ: There are a considerable number of black heel marks.

X: There are many black heel marks.

(b) Anti-scuff Properties

Samples were prepared and placed on a street in the same manner as in the BHM evaluation test to observe the degree of scuffing produced and loss of gloss. The results of evaluation were classified as follows.

⊚: There was no scuffing and loss of gloss.

◯: There was only a little scuffing and loss of gloss.

Δ: There was rather much scuffing and loss of gloss.

X: There was significant scuffing and loss of gloss.

(c) Gloss

Samples were prepared in the same manner as in the BHM evaluation test and reflection at an angle of 60° was measured using a Murakami gloss meter.

(d) Dry Buff Applicability

Samples were prepared in the same manner as in the BHM evaluation test (a) and applied to a buffing operation at 2,500 rpm using a high-speed buffing machine DE-500 manufactured by Amano Co., Ltd. to determine gloss difference at 60° C.

(e) Delamination Properties

A delaminating solution was prepared from 500 g of water, 15 g of sodium metasilicate, 15 g of sodium carbonate, 10 g of mono-ethanolamine, and 0.12 g of sodium n-alkylbenzenesulfonate.

Samples, prepared in the same manner as in the BHM evaluation test (a), were dipped for 20 minutes in the delamination solution at 20° C., washed with gauze, sufficiently washed with a water stream, and dried in air to observe delamination by naked eye observation. The results of evaluation were classified as follows.

◯: Almost all coatings were delaminated.

Δ: More than one half of the coatings were delaminated.

X: Almost no coatings were delaminated.

The results of evaluation of the floor polishing compositions obtained in the above Examples and Comparative Examples are shown in Tables 1–3.

TABLE 1

| | Examples | | | | |
|---|---|---|---|---|---|
| | 1 | 2 1st Step | 2nd Step | 3 1st Step | 2nd Step |
| (A) Ethylenically unsaturated monomers (a) Ethylenically unsaturated carboxylic acid monomers | | | | | |
| Methacrylic acid | 7 | 0.4 | 4 | 0.4 | 4 |
| Acrylic acid | 2.5 | 0.5 | 4 | 0.5 | 4 |
| Itaconic acid | 0.5 | 0.1 | — | 0.1 | — |
| (b) (Meth)acrylic acid alkyl ester monomers | | | | | |
| n-Butyl acrylate | 25 | 8 | 19 | 8 | 22 |
| t-Butyl methacrylate | 10 | 2 | 8 | 2 | 8 |
| Cyclohexyl methacrylate | 10 | 2 | 8 | 2 | 5 |
| Methyl methacrylate | 25 | 2.3 | 2 | 2.3 | 22 |
| (c) Other monomers | | | | | |
| Styrene | 20 | 4 | 15 | 4 | 15 |
| 1,3-Butenediol dimethacrylate | — | — | — | 0.2 | — |
| Allyl methacrylate | — | — | — | 0.5 | — |
| Lauryl mercapatan | — | — | — | — | — |
| Average molecular weight (×10³) | 250 | 300 or more | | 500 or more | |
| Solvent insoluble components | 34 | 40 | | 84 | |
| (B) Energy ray curable monomers | | | | | |
| Trimethylolpropane trimethacrylate | 40 | 50 | | 40 | |
| Triethylene glycol dimethacrylate | 20 | 10 | | 20 | |
| (C) Photoinitiator | | | | | |
| Irgacure 2959 | 2.4 | 2.4 | | 2.4 | |
| Evaluation | | | | | |
| Black heel mark resistance | ○ | ○ | | ○ | |
| Anti-scuff properties | ○ | ◎ | | ◎ | |
| Gloss (%) | 91 | 90 | | 89 | |
| Dry buff applicability | +5 (○) | +4 (○) | | +5 (○) | |
| Delamination properties with alkali | ○ | ○ | | ○ | |

TABLE 2

| | Comparative Examples | | | | |
|---|---|---|---|---|---|
| | 1 | 2 | 3 | 4 | 5 |
| (A) Ethylenically unsaturated monomers (a) Ethylenically unsaturated carboxylic acid monomers | | | | | |
| Methacrylic acid | 2 | 30 | 7 | 7 | 7 |
| Acrylic acid | 0.5 | 1 | 2.5 | 2.5 | 2.5 |
| Itaconic acid | 0.5 | 1 | 0.5 | 0.5 | 0.5 |
| (b) (Meth)acrylic acid alkyl ester monomers | | | | | |
| n-Butyl acrylate | 25 | 25 | 25 | 25 | 25 |
| t-Butyl methacrylate | 10 | 10 | 10 | 10 | 10 |
| Cyclohexyl methacrylate | 10 | 10 | 10 | 10 | 10 |
| Methyl methacrylate | 32 | 13 | 25 | 25 | 25 |
| (c) Other monomers | | | | | |
| Styrene | 20 | 10 | 20 | 20 | 20 |
| 1,3-Butenediol dimethacrylate | — | — | — | 1 | — |
| Allyl methacrylate | — | — | — | 2 | — |
| Lauryl mercapatan | — | — | 0.3 | — | — |
| Average molecular weight (×10³) | 210 | 230 | 110 | Over 500 | 210 |
| Solvent insoluble components | 28 | 26 | 0 | 99 | 28 |
| (B) Energy ray curable monomers | | | | | |
| Trimethylolpropane trimethacrylate | 40 | 40 | 40 | 40 | 0.2 |
| Triethylene glycol dimethacrylate | 20 | 20 | 20 | 20 | 0.1 |

TABLE 2-continued

|  | Comparative Examples | | | | |
|---|---|---|---|---|---|
|  | 1 | 2 | 3 | 4 | 5 |
| (C) Photoinitiator | | | | | |
| Irgacure 2959 | 2.4 | 2.4 | 2.4 | 2.4 | 0.03 |
| Evaluation | | | | | |
| Black heel mark resistance | Δ | * | Δ | Δ | Δ |
| Anti-scuff properties | Δ | | Δ | Δ | Δ |
| Gloss (%) | 90 | | 88 | 78 | 90 |
| Dry buff applicability | +4 (○) | | +2(X) | +2(X) | +3(Δ) |
| Delamination properties with alkali | X | | ○ | X | ○ |

* Coating could not be applied.

TABLE 3

|  | Comparative Examples | | | | |
|---|---|---|---|---|---|
|  | 6 | 7 | 8 | 9 | 10 |
| (A) Ethylenically unsaturated monomers | | | | | |
| (a) Ethylenically unsaturated carboxylic acid monomers | | | | | |
| Methacrylic acid | 7 | 7 | 7 | ** | ** |
| Acrylic acid | 2.5 | 2.5 | 2.5 | | |
| Itaconic acid | 0.5 | 0.5 | 0.5 | | |
| (b) (Meth)acrylic acid alkyl ester monomers | | | | | |
| n-Butyl acrylate | 25 | 25 | 25 | | |
| t-Butyl methacrylate | 10 | 10 | 10 | | |
| Cyclohexyl methacrylate | 10 | 10 | 10 | | |
| Methyl methacrylate | 25 | 25 | 25 | | |
| (c) Other monomers | | | | | |
| Styrene | 20 | 20 | 20 | | |
| 1,3-Butenediol dimethacrylate | — | — | — | | |
| Allyl methacrylate | — | — | — | | |
| Lauryl mercapatan | — | — | — | | |
| Average molecular weight (×10³) | 210 | 210 | 210 | | |
| Solvent insoluble components | 28 | 28 | 28 | | |
| (B) Energy ray curable monomers | | | | | |
| Trimethylolpropane trimethacrylate | 200 | 40 | 40 | 40 | |
| Triethylene glycol dimethacrylate | 50 | 20 | 20 | 20 | |
| (C) Photoinitiator | | | | | |
| Irgacure 2959 | 2.5 | 0.003 | 14 | 2.4 | 2.4 |
| Evaluation | | | | | |
| Black heel mark resistance | Δ | X | ○ | Δ | Δ |
| Anti-scuff properties | ○ | X | ○ | ○ | Δ |
| Gloss (%) | 73 | 89 | 77 | 88 | 87 |
| Dry buff applicability | +4(○) | +2(x) | +3(Δ) | +2(X) | +2(X) |
| Delamination properties with alkali | X | ○ | Δ | X | X |

** A urethane-based polymer

The evaluation results shown in Tables 1–3 can be summarized as follows.

The floor polishing compositions of the present invention prepared in Examples 1–3 showed superior film performance in all evaluation items, i.e. black heel mark resistance, anti-scuff properties, glossiness, dry buff properties, and delamination properties.

Comparative Example 1 is an example of a composition produced from a copolymer (A) containing the component (a) in an amount less than that required in the present invention. The composition exhibited inferior black heel mark resistance, anti-scuff properties, and delamination properties.

Comparative Example 2 is an example of a composition produced from a copolymer (A) containing the component (a) in an amount more than that required in the present invention. The viscosity of the composition was too high to provide adequate coating.

Comparative Example 3 is an example of a composition produced from a copolymer with an average molecular weight smaller than that required in the present invention and containing insoluble components in an amount less than that required in the present invention. The composition exhibited inferior black heel mark resistance, anti-scuff properties, and dry buff properties.

Comparative Example 4 is an example of a composition produced from a copolymer with an average molecular weight larger than that required in the present invention and containing insoluble components in an amount more than that required in the present invention. The composition exhibited inferior film forming capability and durability.

Comparative Example 5 is an example of a composition which contains the component (B) in an amount less than that required in the present invention. The composition exhibited inferior black heel mark resistance and anti-scuff properties.

Comparative Example 6 is an example of a composition which contains the component (B) in an amount more than that specified in the present invention. The composition exhibited inferior gloss and delamination properties.

Comparative Example 7 is an example of a composition which contains the component (C) in an amount less than that specified in the present invention. The composition exhibited inferior durability.

Comparative Example 8 is an example of a composition which contains the component (C) in an amount more than that specified in the present invention. The composition exhibited inferior gloss.

Comparative Examples 9 and 10 are examples of compositions produced using a urethane-based polymer as a copolymer dispersion. The composition exhibited inferior durability, dry buff properties, and particularly delamination properties.

Obviously, numerous modifications and variations of the present invention are possible in light of the above teachings. It is therefore to be understood that, within the scope of the appended claims, the invention may be practiced otherwise than as specifically described herein.

What is claimed is:

1. An aqueous coating composition comprising:
   (A) 100 parts by weight on a solid component basis of an aqueous dispersion of a copolymer having a weight average molecular weight of 200,000 or more obtained by the emulsion polymerization of a mixture of mono-ethylenically unsaturated monomers comprising (a) 5–30 wt % of an ethylenically unsaturated carboxylic acid monomer, (b) 10–80 wt % of a (meth)acrylic acid alkyl ester monomer, and (c) 0–85 wt % of a monomer polymerizable with the monomers (a) and (b), wherein the total of monomers (a), (b), and (c) is 100 wt %,
   (B) 0.01–200 parts by weight of at least one unsaturated monomer curable with energy rays, and
   (C) a photoinitiator in an amount of 0.5–10 parts by weight for 100 parts by weight of the component (B).

2. The aqueous coating composition according to claim 1, wherein the mono-ethylenically unsaturated carboxylic acid monomer (a) is at least one selected from the group consisting of a mono-carboxylic acid, a dicarboxylic acid, a half ester of an unsaturated carboxylic acid, an anhydride of an unsaturated carboxylic acid, a potassium salt thereof, a sodium salt thereof, an ammonium salt thereof, a magnesium salt thereof, and an a calcium salt thereof.

3. The aqueous coating composition according to claim 2, wherein from 20 to 98 wt % of the copolymer (A) is toluene insoluble.

4. The aqueous coating composition according to claim 1, wherein the amount of mono-ethylenically unsaturated carboxylic acid monomer (a) in the component (A) is 6–25 wt %.

5. The aqueous coating composition according to claim 1, wherein the (meth)acrylic acid alkyl ester monomer (b) is at least one (meth)acrylic acid ester selected from the group consisting of methyl (meth)acrylate, ethyl (meth)acrylate, propyl (meth)acrylate, n-butyl (meth)acrylate, i-butyl (meth)acrylate, t-butyl (meth)acrylate, amyl (meth)acrylate, i-amyl (meth)acrylate, hexyl (meth)acrylate, 2-ethylhexyl (meth)acrylate, n-octyl (meth)acrylate, i-octyl (meth)acrylate, cyclohexyl (meth)acrylate, nonyl (meth)acrylate, lauryl (meth)acrylate, and stearyl (meth)acrylate.

6. The aqueous coating composition according to claim 1, wherein the amount of the (meth)acrylic acid alkyl ester monomer (b) in the component (A) is 20–70 wt %.

7. The aqueous coating composition according to claim 1, wherein from 20 to 98 wt % of the copolymer (A) is toluene insoluble.

8. The aqueous coating composition according to claim 1, wherein the energy ray curable unsaturated monomer (B) is at least one selected from the group consisting of a polyol polyacrylate, a polyester acrylate, an epoxy acrylate, and a urethane acrylate.

9. The aqueous coating composition according to claim 8, wherein the energy ray curable unsaturated monomer (B) further comprises at least one other polymerizable acrylate.

10. The aqueous coating composition according to claim 1, wherein the photoinitiator (C) is a water soluble or hydrophilic photoinitiator.

11. The aqueous coating composition according to claim 1, wherein the photoinitiator (C) is at least one selected from the group consisting of 4-(2-hydroxyethoxy)phenyl-(2-hydroxy-2-propyl)ketone, 2-hydroxy-2-methylpropiophenone, 1-(4-isopropylphenyl)-2-hydroxy-2-methylpropan-1-one, 1-Hydroxy-cyclohexyl-phenyl-ketone, benzoin, benzoin methyl ether, benzophenone, benzyl dimethyl ketal, and 2,4-dimethyl thioxanethone.

12. A floor polishing composition comprising the aqueous coating composition of claim 1.

13. The aqueous coating composition according to claim 1, wherein the copolymer (A) has a weight average molecular lar weight of 250,000 or more.

14. The aqueous coating composition according to claim 1, wherein the copolymer (A) comprises polymerized units of at least one of methacrylic acid, acrylic acid or itoconic acid; and at least one of n-butylacrylate, t-butylmethacrylate, cyclohexylmethacrylate, or methylmethacrylate; and the unsaturated monomer (B) comprises at least one of trimethylol propane trimethacrylate or triethylene glycol dimethacrylate.

15. A floor coating comprising a coating obtained by curing and drying the aqueous coating composition of claim 14.

16. The aqueous coating composition of claim 1, wherein the copolymer (A) comprises polymerized units of methacrylic acid, acrylic acid, itoconic acid, n-butylacrylate, t-butylmethacrylate, and cyclohexylmethacrylate; and the unsaturated monomer (B) comprises trimethylol propane trimethacrylate and triethylene glycol dimethacrylate.

17. A floor coating comprising a coating obtained by drying and curing the aqueous coating composition according to claim 16.

18. A substrate coated with a coating obtained by curing the aqueous coating composition according to claim 1.

19. A coated substrate obtained by applying the aqueous coating composition according to claim 1 to a surface of the substrate, and drying and curing the aqueous coating composition to form a coating on the substrate, wherein the coating comprises a mixture of the copolymer (A) and the cured monomer (B).

* * * * *